United States Patent
Shi

(10) Patent No.: US 9,707,671 B2
(45) Date of Patent: Jul. 18, 2017

(54) ELECTRIC TOOL AND CONTROLLING METHOD THEREOF

(71) Applicant: CHERVON (HK) LIMITED, Wanchai (HK)

(72) Inventor: Pingbo Shi, Nanjing (CN)

(73) Assignee: Chervon (HK) Limited, Wanchai (HK)

(*) Notice: Subject to any disclaimer, the term of this patent is extended or adjusted under 35 U.S.C. 154(b) by 588 days.

(21) Appl. No.: 14/264,386

(22) Filed: Apr. 29, 2014

(65) Prior Publication Data
US 2014/0338939 A1 Nov. 20, 2014

(30) Foreign Application Priority Data
May 20, 2013 (CN) .......................... 2013 1 0188867

(51) Int. Cl.
 B25B 23/147 (2006.01)
 B25B 23/14 (2006.01)
 H02P 29/00 (2016.01)
 H02P 29/032 (2016.01)

(52) U.S. Cl.
 CPC ........ *B25B 23/147* (2013.01); *B25B 23/1405* (2013.01); *H02P 29/00* (2013.01); *H02P 29/032* (2016.02)

(58) Field of Classification Search
 CPC ....... B25B 21/00; B25B 23/14; B25B 23/147; B25B 23/1405; B25B 23/1456; H01M 2/1022; H01M 10/42; H01M 10/425; H02P 29/032; H02P 29/0055; H02P 3/08; H02P 7/04; H02P 7/29; H02P 7/285; H02P 7/295; H02P 29/00; H02P 29/20

USPC ............... 173/1, 2, 4, 176, 181, 183, 217; 318/432, 434, 139; 320/162
 See application file for complete search history.

(56) References Cited

U.S. PATENT DOCUMENTS

| | | | | |
|---|---|---|---|---|
| 5,284,217 A | * | 2/1994 | Eshghy ................... | B25B 23/14 173/176 |
| 5,315,501 A | * | 5/1994 | Whitehouse .......... | B23P 19/066 173/176 |
| 5,631,823 A | * | 5/1997 | Layer ....................... | B21J 15/28 173/176 |
| 6,516,896 B1 | * | 2/2003 | Bookshar ................ | B25B 23/14 173/1 |

(Continued)

*Primary Examiner* — Scott A. Smith
(74) *Attorney, Agent, or Firm* — Greenberg Traurig, LLP

(57) ABSTRACT

An electric tool has a motor, an implementing member driven by the motor for driving a working element and a controlling circuit for controlling the electric tool. The controlling circuit includes a current detecting module for detecting the current flowing through the motor; a microprocessor for memorizing and storing a current value; an user interface module for an user to select working modes, and the working modes at least comprising a learning mode for recording the current value after the implementing member has driven the working element and a constant torque mode for driving other working elements having the same size based on the recorded current value; and a driving module for driving or stopping the torque output of the motor. The electric tool can achieve the function of electronic clutch so as to drive screws having the same size with substantially the same effect. The present disclosure also discloses a controlling method by using the above controlling circuit.

13 Claims, 4 Drawing Sheets

(56) References Cited

U.S. PATENT DOCUMENTS

| | | | | |
|---|---|---|---|---|
| 6,680,595 B2* | 1/2004 | Ito | B25B 23/1405 | 173/11 |
| 6,836,614 B2* | 12/2004 | Gilmore | B23P 19/066 | 173/176 |
| 6,945,337 B2* | 9/2005 | Kawai | B25B 23/1405 | 173/176 |
| 7,091,683 B1* | 8/2006 | Smith | A61B 17/8875 | 173/176 |
| 7,182,147 B2* | 2/2007 | Cutler | B25B 21/00 | 173/1 |
| 7,410,006 B2* | 8/2008 | Zhang | B23D 59/001 | 173/1 |
| 7,770,658 B2* | 8/2010 | Ito | B23P 19/066 | 173/1 |
| 7,936,140 B2* | 5/2011 | Wei | H02P 7/295 | 173/176 |
| 7,942,211 B2* | 5/2011 | Scrimshaw | B23B 31/123 | 173/176 |
| 8,025,106 B2* | 9/2011 | Schmidt | B25B 21/00 | 173/1 |
| 9,024,549 B2* | 5/2015 | Shi | H02P 29/032 | 318/139 |
| 2003/0047331 A1* | 3/2003 | Henderson | B23P 19/066 | 173/4 |
| 2004/0182588 A1* | 9/2004 | Tokunaga | B25B 21/02 | 173/2 |
| 2005/0205275 A1* | 9/2005 | Kaminski | B25B 23/14 | 173/2 |
| 2005/0263303 A1* | 12/2005 | Shimizu | B25B 23/1475 | 173/2 |
| 2006/0220605 A1* | 10/2006 | Funabashi | H01M 2/1022 | 318/434 |
| 2008/0196914 A1* | 8/2008 | Nakazawa | B25B 21/00 | 173/176 |
| 2010/0065293 A1* | 3/2010 | Lohr | B25B 23/147 | 173/1 |
| 2011/0012564 A1* | 1/2011 | Yang | H02J 7/0031 | 320/162 |
| 2011/0303427 A1* | 12/2011 | Tang | B23P 19/066 | 173/1 |
| 2012/0074877 A1* | 3/2012 | Shi | H02P 29/032 | 318/139 |

\* cited by examiner

ELECTRIC TOOL AND CONTROLLING METHOD THEREOF

RELATED APPLICATION INFORMATION

The subject application claims the benefit of CN 201310188867.X, filed on May 20, 2013, the disclosure of which is incorporated herein by reference in its entirety.

FIELD OF THE DISCLOSURE

The present disclosure relates to an electric tool and a controlling method thereof

BACKGROUND OF THE DISCLOSURE

An electric screwdriver, which is a common domestic tool, can be used by a wide range of people. However, for unprofessional, do-it-yourself ("DIY") users it can be difficult to control the screwing depth and the pre-tightening torque of the screw, which often causes the operation to be failed or imperfect.

In the prior art, some screwdrivers have a mechanical rotatable collar provided with a plurality of torque value for different working situations. But, the torque value corresponding to each position of the rotatable collar is a certain value, thus the users cannot always choose a level that absolutely meets their requirements. If the user can not choose a quite adequate torque value, he can only choose a similar one. In this case, the user cannot always control the machine to precisely accomplish the work unless they have good operating skill and rich experience. Additionally, even if the user chooses a quite adequate torque value, when tightening the screw, the screw often cannot be screwed in place or tightened too much. In the case of a heavy workload, the operation is costly and time-consuming, which results in a low working efficiency.

Additionally, after choosing an appropriate torque value, the electric screwdriver of the prior art usually starts to work by directly activating the trigger. For example, when tightening a plurality of screws having the same size in a batch of work pieces having the same material, the screws are tightened in place only by the operating experience of the user, but the user without rich experience cannot obtain the same result as the experienced user, thus different operations result in different effect.

SUMMARY

In order to overcome the deficiencies existing in the prior art, the present disclosure provides an electric tool and a controlling method thereof. The electric tool provides an electronic clutch and can learn by itself and perform an operation for the fasteners having the same size according to the memorized and stored constant torque value in a learning mode.

The present disclosure provides an electric tool comprising a motor, an implementing member driven by the motor for driving a working element and a controlling circuit, wherein the controlling circuit comprises a current detecting module for detecting current flowing through the motor; a microprocessor for memorizing and storing a current value; an user interface module for an user to select working modes, the working modes at least comprising a learning mode for recording the current value when the implementing member has driven the working element and a constant torque mode for driving other working elements having the same size based on the recorded current value; and a driving module for driving or stopping a torque output of the motor. Such controlling circuit can memorize and store the torque value for screwing the first fastener into the work piece in the learning mode, and then switch to the constant torque mode. When screwing the fasteners having the same size into the work piece, the driving module stops the torque out of the motor upon reaching the torque value, thereby ensuring that these fasteners can be screwed with the same depth as the first fastener.

Further, the controlling circuit of the electric tool further comprises a power module for providing power to the microprocessor and the driving module and a current signal processing module for processing the current value detected by the current detecting module, and the microprocessor is configured to memorize and store the current value processed by the current signal processing module. In the instance that the current value detected by the current detecting module is too low, the current value is amplified and filtered by the current signal processing module and then memorized and stored by the microprocessor, thereby accomplishing the leaning mode more effectively.

The working modes of the electric tool further comprise a constant torque transitory invalidation mode for driving other working members having the different sizes from the above size. In the constant torque mode, if the user needs to operate the fasteners having the different sizes, the electric tool can be switched into the constant torque transitory invalidation mode, thus the user can control the operation of the fasteners till the fasteners are completely screwed into the work piece. At that moment, the controlling circuit does not detect, memorize and store the current. When the operation of the fasteners is finished, the user can switch the tool back to the constant torque mode, and still continue to operate the fasteners having the first size since the torque value stored in the first step is still memorized and stored.

The controlling circuit of the electric tool comprises a forward and reversal rotation signal collecting module, which can determine whether the motor is rotated forwardly or reversely according to the operation of the user for pushing the forward and reversal pushing-button. When the motor is rotated reversely, the signal collected by the forward and reversal rotation signal collecting module can be fed back to the microprocessor, and the microprocessor automatically switches the working modes to a reversal rotation high-efficiency mode. The reversal rotation high-efficiency mode enables the motor to have a maximum torque output, thereby accomplishing the process of reversal rotation more effectively, for example, the process of releasing the fasteners. The working mode enters the reversal rotation high-efficiency mode when the motor is rotated reversely no matter whether the microprocessor has memorized and stored the current value.

In one case, the rotating speed of the motor is adjusted by a potentiometer, that is, the pressing amount of the trigger is proportional to the rotating speed of the motor. Because different users may have different operating habits, when the fasteners are to be screwed into the work piece, different pressing amount of the trigger can cause different rotating speed of the motor, which causes different torque values to be collected by the machine, thus the working effect in the subsequent constant torque mode is poor. As the users may reduce the rotating speed of the motor habitually when the fasteners are to be screwed into the work piece, the effect in the learning mode can be obtained. That is, the microprocessor compensates the current value detected by the current detecting module or the current value processed by the current signal processing module with a compensation coefficient inversely proportional to the pressing amount of the trigger. That is, the greater the pressing amount of the trigger, the smaller the compensation coefficient; or the smaller the pressing amount of the trigger, the greater the compensation coefficient. When reaching the compensated current value, it can be determined that the fastener has been completely screwed into the work piece, and thus the driving module stops the torque output of the motor.

In this embodiment, the electric tool comprises a battery pack and a circuit board having a switching element, and the controlling circuit further comprises a detecting module for detecting the temperature, current and voltage of the battery pack or the temperature of the switching element. The driving module can stop the torque output of the motor when the temperature of the battery pack is higher than a preset value, or stop the torque output of the motor when the current value in the battery pack is higher than a preset value, or stop the torque output of the motor when the voltage in the battery pack is lower than a preset value, or stop the torque output of the motor when the temperature of the switching element is higher than a preset value, thereby achieving over temperature protection and over current protection for the electric tool and under-voltage protection for the battery pack.

The electric tool further comprises an user interface comprising at least one operating key for selecting the working modes, a first signal indicating light for indicating whether the learning mode is selected, a second indicating light for indicating whether the constant torque mode is selected, and a third indicating light for indicating whether the constant torque transitory invalidation mode is selected so as to help the users to identify the present working mode.

According to another embodiment, the present disclosure further provides a controlling method of an electric tool, the electric tool comprising a motor, an implementing member driven by the motor for driving a working element, the controlling method comprising the steps of: detecting current flowing through the motor by a current detecting module; memorizing and storing a current value via a microprocessor; selecting the working modes by an user module, and the working modes at least comprising a learning mode for recording the current value after the implementing member has driven the working element and a constant torque mode for driving other working members having the same size based on the recorded current value; driving or stopping the torque output of the motor by a driving module controlled by the microprocessor.

The controlling method of an electric tool further comprises the steps of processing a current value detected by the current detecting module via a current signal processing module and providing power to the microprocessor and the driving module by a power module. The microprocessor can memorize and store the current value processed by the current signal processing module. In the case that the current value detected by the current detecting module is too small, the current value can be amplified and filtered by the current signal processing module, and then be memorized and stored by the microprocessor, thereby accomplishing the learning mode more effectively.

The working modes of the electric tool further comprise a constant torque transitory invalidation mode for driving other working members having the different sizes from the above size. The controlling method further comprises the step of selecting the constant torque transitory invalidation mode by the user interface module.

The working modes of the electric tool further comprise a reversal rotation high-efficiency mode in which the motor has the maximum torque output. The controlling method of the electric tool further comprises the step of collecting the forward and reversal rotation signals of the motor by a forward and reversal rotation signal collecting module. The electric tool is controlled by the microprocessor to be switched to the reversal rotation high-efficiency mode when the motor is rotated reversely no matter whether the microprocessor has memorized and stored the current value. The reversal rotation high-efficiency mode enables the motor to output the maximum torque and ensures that the process of reversal rotation can be accomplished quickly and effectively, for example, the process of releasing the fastener.

The electric tool further comprises a trigger for driving or stopping the torque output of the motor, and the controlling method further comprises the step of compensating for the current value detected by the current detecting module or the current value processed by the current signal processing module with a compensation coefficient inversely proportional to the pressing amount of the trigger via the microprocessor, thereby achieving the effect in the learning mode.

The electric tool further comprises a battery pack and the controlling method further comprises the step of detecting the temperature, current and voltage of the battery pack by a detecting module. The driving module can stop the torque output of the motor when the temperature of the battery pack is higher than a preset value, or stop the torque output of the motor when the current value in the battery pack is higher than a preset value, or stop the torque output of the motor when the voltage in the battery pack is lower than a preset value.

DETAILED DESCRIPTION

The following description will explain the details of the controlling circuit of the electric tool and the controlling method thereof according to the present disclosure with reference to the drawings.

Figure 1:
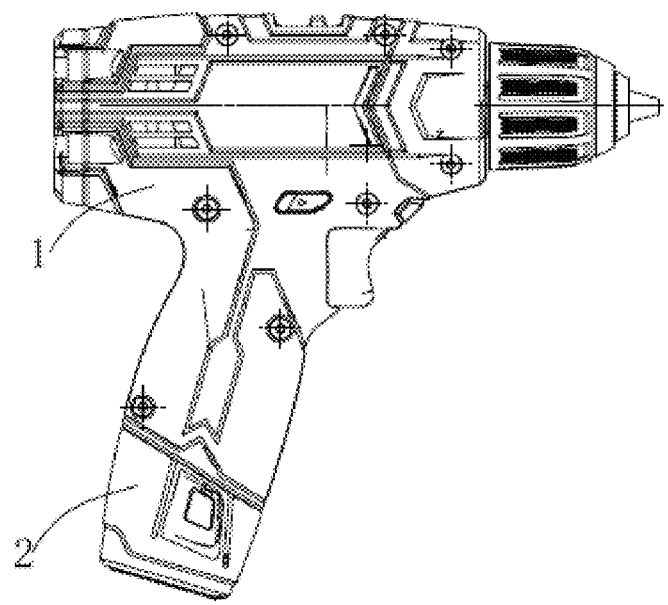
FIG. 1 is a schematic plane view of an electric tool according to one embodiment of the present disclosure.
Figure 2:
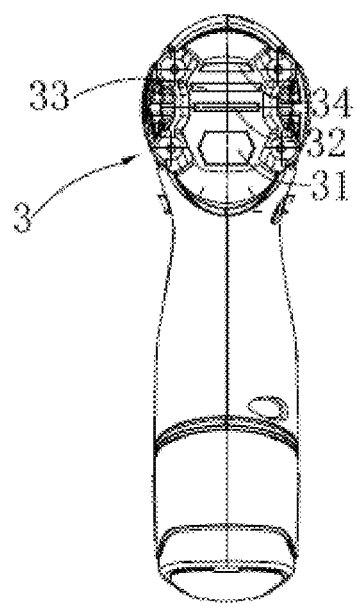
FIG. 2 is a schematic plane view of the electric tool of FIG. 1 taken from another angle.

FIGS. 1 and 2 show an electric tool. The electric tool comprises a motor and an implementing member driven by the motor for driving a working element. Preferably, the electric tool is an electric screwdriver. The electric screwdriver comprises a housing 1, a motor accommodated in the housing 1, a transmission mechanism, a screwdriver head, a battery pack 2, an user interface 3 and a controlling circuit for controlling the electric tool. The battery pack 2 is connected to the housing 1 and provides power to the motor. The user interface 3 comprises at least one operating key 31 and three indicating lights 32, 33 and 34. The transmission mechanism is well known by the person skilled in the art, for example, the transmission mechanism can convert the rotating motion of the motor into the rotating motion of the screwdriver head, and the speed of the motor is usually reduced by the gear in the gearbox. When a suitable torque is needed, the transmission ratio can be adjusted so that the screwdriver head can drive the screw. Here, the screwdriver head is used as the implementing member for driving the work piece (e.g., a screw). The screwdriver head can be clamped by a quick clamping assembly. Certainly, it is well known by the person skilled in the art that the electric tool can be an electric screwdriver, an electric spanner or other electric tools. For example, the drill head of the electric screwdriver can be used as the implementing member for driving the work piece to be processed or the sleeve of the electric spanner can be used as the implementing member for driving the work piece.

Figure 3:
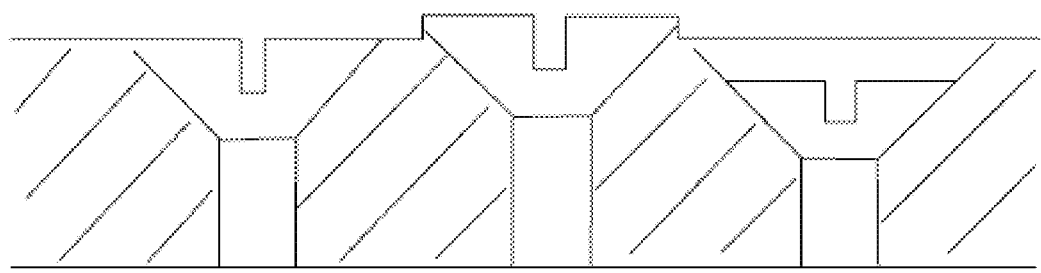
FIG. 3 is a schematic view illustrating the working effect during screwing the screw by the electric screwdriver according to one embodiment of the present disclosure.

FIG. 3 shows three possible situations when the user uses the electric screwdriver disclosed in the prior art to operate the screws having the same size. As shown in the left part, the screw is completely screwed into the work piece. As shown in the middle part, the screw has not been completely screwed into the work piece. As shown in the right part, the screw is excessively screwed into the work piece. The present disclosure provides a controlling circuit of the electric tool and a controlling method thereof, which can obtain the function of an electronic clutch and enable screws having the same size to be screwed with substantially the same effect. The following description will explain the controlling circuit of the electric tool and the controlling method thereof Preferably, the electric tool is an electric screwdriver.

Figure 4:
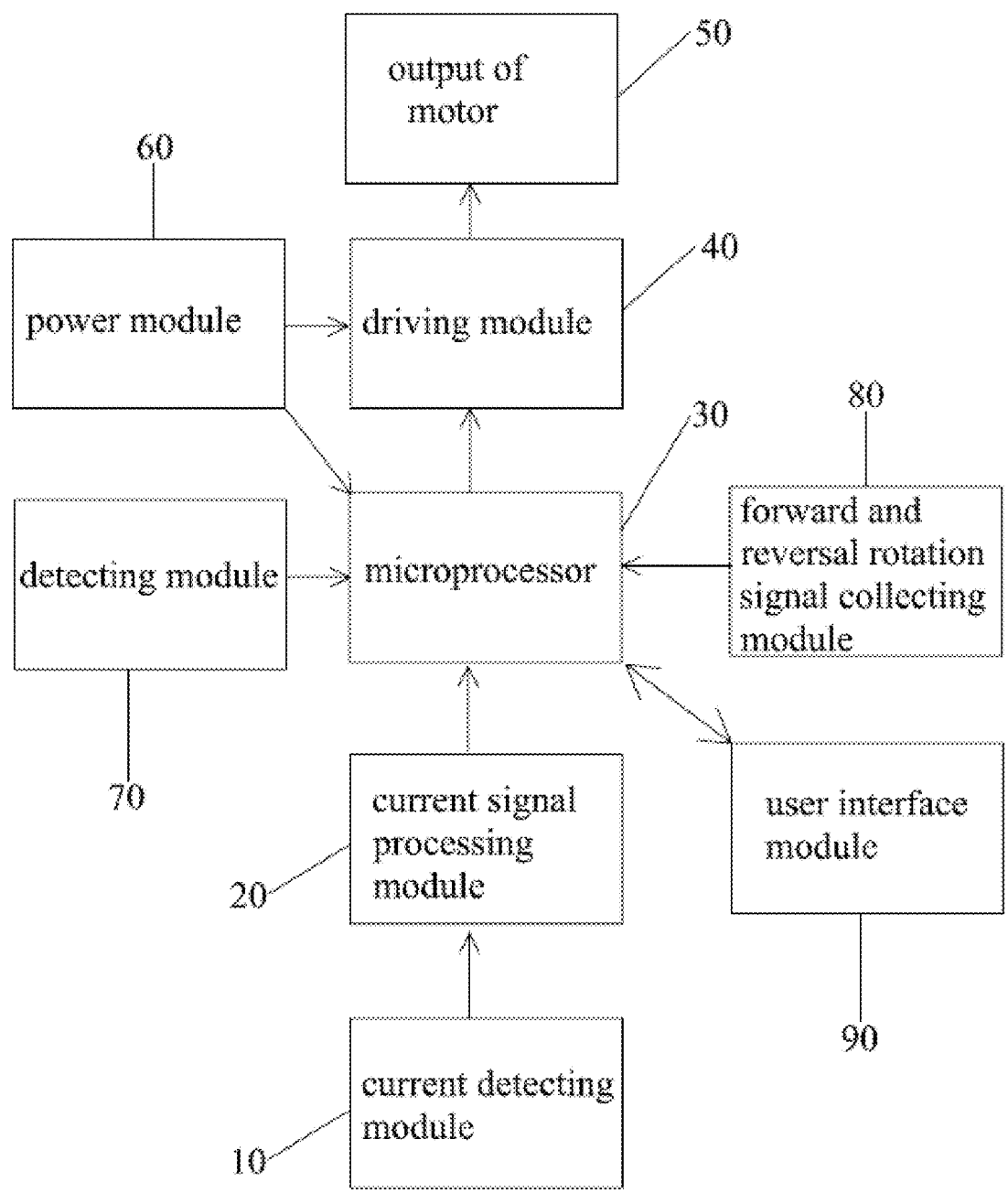
FIG. 4 is a block view of the controlling circuit of the electric tool according to one embodiment of the present disclosure.

FIG. 4 illustrates a block view of the controlling circuit of the electric tool. In this embodiment, the electric screwdriver is taken as an example to explain the controlling circuit in detail. The controlling circuit can control the electric screwdriver to switch among a plurality of working modes including a learning mode, a constant torque mode, a constant torque transitory invalidation mode and a reversal rotation high-efficiency mode. Before screwing a batch of screws having the same size (i.e., the same size or the same pitch), the learning mode is used to record the torque value for completely screwing a first screw (the leftmost screw shown in FIG. 3) having this size into the work piece when screwing the first screw in the learning mode. The torque value herein may not necessarily refer to the measured torque value, but also refer to the measured current value, voltage value, power value and/or other associated parameters relating to the torque value. Preferably, in one embodiment of the present disclosure, the current value relating to the torque value is measured. The constant torque mode is used when screwing the remainder screws having this size, and based on the current value recorded in the learning mode. It is possible to determine that the screw is completely screwed into the work piece so long as the current value reaches the above recorded current value. That is, in the constant torque mode, other screws can also achieve the same effect as the screws screwed in the learning mode. The constant torque transitory invalidation mode is temporarily used for operating other screws having another size when screwing the screws having the last size. In this mode, it is not necessary to record the current value when the screw is completely screwed into the work piece, and the user only needs to observe whether the screw is completely screwed into the work piece. After completely screwed into the work piece, the user needs to release the trigger manually to power off the motor. Then, when the user switches the tool to the constant torque mode, the last recorded current value still exists. The user can still screw the screws having the last size, and when the recorded current value is reached, the motor is powered off automatically. This operation is especially for the user without rich experience and achieves a simple operation. As for the reversal rotation high-efficiency mode, when the controlling circuit detects the reversal rotation of the motor, the screw can be released with full torque or large torque so as to ensure a high efficiency in the process of releasing the screw.

Still referring to FIG. 4, the controlling circuit of the electric screwdriver in this embodiment comprises a current detecting module 10, a current signal processing module 20, a microprocessor 30, a driving module 40, an output of motor 50, a power module 60, a detecting module 70, a forward and reversal rotation signal collecting module 80 and an user interface module 90. The current detecting module 10 is used to detect the value of the current flowing through the motor, and the current signal processing module 20 is used to process the current value detected by the current detecting module 10, for example, amplifying and filtering the current value. The microprocessor 30 can memorize and store the amplified and filtered current value. As well known by the person skilled in the art, the current value detected by the current detecting module 10 may not be amplified and filtered, but directly memorized and stored by the microprocessor 30. Additionally, the microprocessor 30 can comprise a micro controller (MCU) or a memory. The driving module 40 can be controlled by the microprocessor 30 according to the working mode selected by the user so as to drive or stop the torque output of the motor 50. The power module 60 is used to provide power to the microprocessor 30 and the driving module 40. The detecting module 70 is used to detect the temperature, current and voltage of the battery pack or the temperature of the switching element. Preferably, the switching element is a MOSFET. When the temperature of the battery pack is higher than a preset value, the torque output of the motor is stopped; when the current value in the battery pack is higher than a preset value, the torque output of the motor is stopped; when the voltage in the battery pack is lower than a preset value, the torque output of the motor is stopped; or when the temperature of the switching element is higher than a preset value, the torque output of the motor is stopped. The forward and reversal rotation signal collecting module 80 is used to detect the forward and reversal rotation of the motor. During the forward rotation, the working mode is switched among the learning mode, the constant torque mode and the constant torque transitory invalidation mode; however, during the reversal rotation, the working mode is automatically switched to the reversal rotation high-efficiency mode. The user interface module 90 is connected to the microprocessor 30 and the user interface 3. According to the instruction from the user interface 3, the user can know the present working mode of the electric screwdriver. Additionally, the signal inputted to the user interface 3 can be transmitted to the microprocessor 30 via the user interface module 90.

During the actual using process of the electric screwdriver, when the screw is completely screwed into a wooden plate, the user observes the working effect (the screw is flush with the working plane, as the leftmost screw shown in FIG. 3), and then immediately releases the trigger to stop the machine. In the turn off delay time of the machine, by pushing the operating key 31 on the electric screwdriver for arranging the torque value, the torque value for completely screwing the screw into the wooden plate is stored. Subsequently, the torque valve for operating the screws having the same size can be determined based on the stored torque value, and when reaching the stored torque value, the torque output of the motor can be stopped immediately, thus the user can obtain the same working effect when screwing the screw having the same size on the same working piece. However, during the learning process of the tool, since different users may have different habits, that is, the rotating speeds of the tool before the screws are completely screwed into the working plane are different (that is, the pressing amount of the main trigger of the tool determines the rotating speed of the tool, i.e., using a potentiometer), which causes the torque values collected by the tool are different and thus the working effect in the subsequent constant torque mode is poor. Generally, the users habitually reduce the rotating speed before completely screwing the screw, thus the working effect cannot reach the effect in the learning mode, as shown by the middle screw in FIG. 3.

To ensure the consistence between the working effects in the constant torque mode and in the learning mode, it needs to compensate the torque signal (the current signal processed by the processing circuit module) collected by the tool. The compensating method comprises: performing a gain compensation for the circuit signal, wherein the compensation coefficient depends on the pressing amount of the trigger. The larger the given amount, the smaller compensation coefficient; and the smaller the given amount, the larger the compensation coefficient. Thus, the compensation coefficient is inversely proportional to the pressing amount of the trigger. When screwing the screws in a working piece, it can ensure that the screws reach the working piece consistently and the screwed depths of the screws are also consistent. After the learning process of the tool, it can automatically determine whether the best working effect has been reached. If so, the torque output of the motor is automatically stopped without observing the working effect by people. The compensation function can overcome the problem that the signals of the torque are inconsistent because of the different pressing amount of the main trigger of the tool by the user in the learning mode. Additionally, the compensation can be performed linearly by sections. As a preferable embodiment, when the pressing amount of the trigger is 0%-40%, the collected torque is compensated by B1; when the pressing amount of the trigger is 40%-70%, the collected torque is compensated by B2; and when the pressing amount of the trigger is 70%-100%, the collected torque is compensated by B3, wherein B1>B2>B3.

Figure 5:
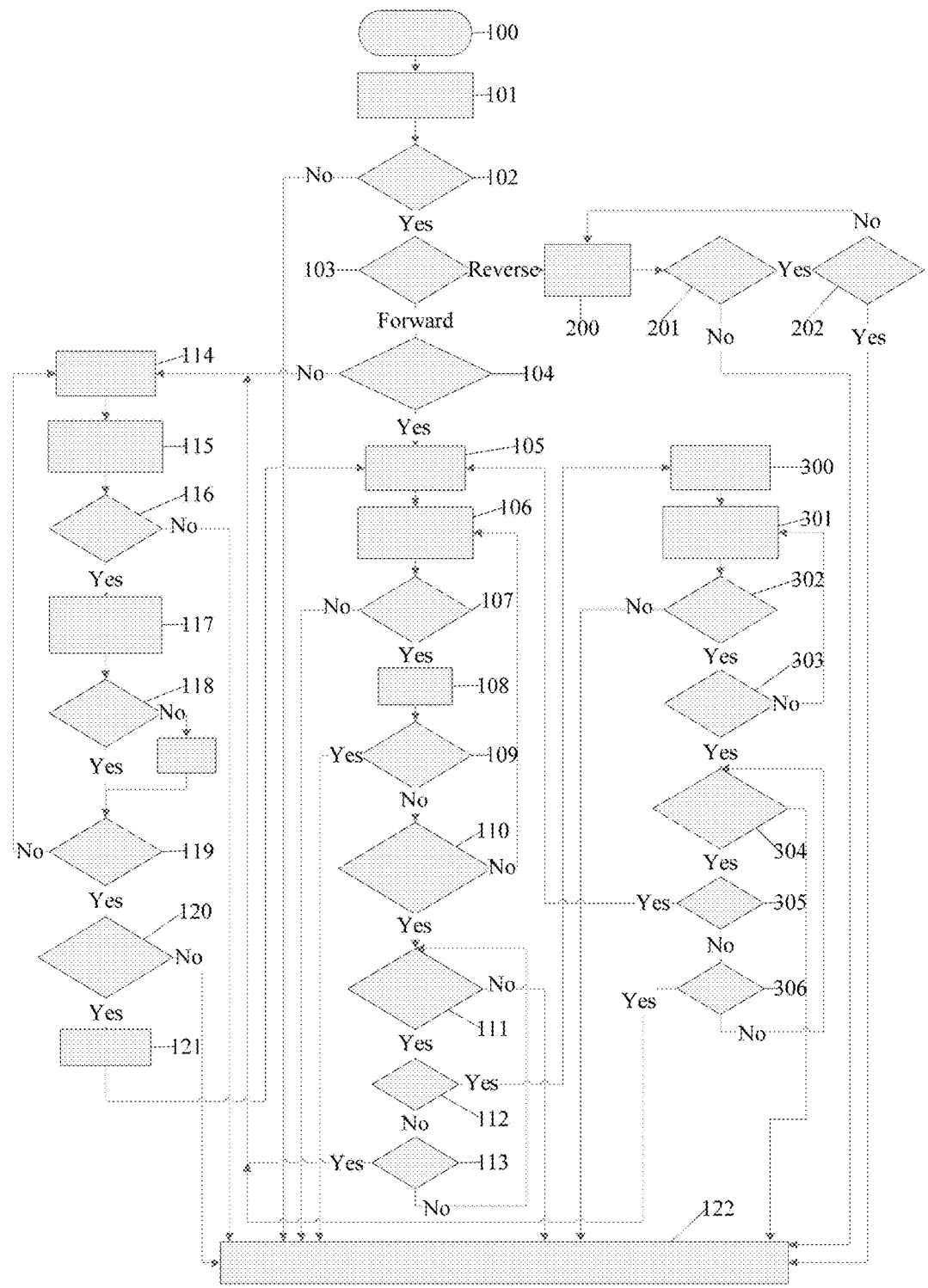
FIG. 5 is a flowchart view of the controlling method of the electric tool according to one embodiment of the present disclosure.

Referring to FIG. 5, the working principle of the electric screwdriver according to one embodiment of the present disclosure is as follows.

When screwing the first screw, the user can control the tightening effect. When achieving the best working effect, the trigger is released immediately and the storing operation key is pressed down so that the machine automatically stores the reached torque value. At the moment, the tool stores the current value after being amplified and filtered by the processing module, thereby accomplishing the learning mode of the machine.

When screwing the second screw and the subsequent screws having the same size, after the machine is normally started up, it automatically detects the working current of the tool and determines the present torque of the machine. When reaching the torque value stored in the first step, the torque output of motor is stopped immediately. At this moment, the torque output of the machine is consistent with the stored torque, thereby accomplishing the constant torque mode of the machine and achieving the function of the electronic clutch.

When it needs to screw another kind of the screw or use the machine on another kind of working piece in the constant torque mode, the machine provides a constant torque transitory invalidation mode. In this mode, the working effect is completely controlled by people and the full torque is outputted. With pressing down the storing operation key 31 again, the machine is switched into the constant torque transitory invalidation mode, but the torque value stored in the first step is still recorded in the machine. If it needs to return to the constant torque mode, the storing operation key 31 is pressed again, and the above working mode can be displayed in the user interface of the machine. For example, the indicating lights 32, 33 and 34 can indicate the present working mode as the learning mode, the constant torque mode and the constant torque transitory invalidation mode, respectively.

In the constant torque mode, the stored torque value can be erased by keeping pressing the operating key for a long time and ready for the next learning process. During the process of releasing the screw (i.e., during the reversal rotation of the motor of the machine), the maximum torque is outputted. It does not determine whether the stored constant torque value has been reached no matter whether the constant torque value has been stored in the machine so as to enhance the working efficiency of releasing the screw by the user.

Still referring to FIG. 5, it shows a preferable controlling method of the electric screwdriver. The controlling method comprises the steps as follows: step 100 of pressing the trigger to start up; step 101 of initializing the system; step 102 of detecting whether the temperature or the voltage is normal; if yes, performing step 103 of determining the forward and reversal rotation and entering the reversal rotation high-efficiency mode if the reversal rotation is determined. In this step 103, firstly, performing step 200 of collecting the main switching signal and driving the motor to rotate reversely, then performing step 201 of detecting whether the temperature or the voltage is normal; if no, performing step 122 of stopping the motor and waiting for power off, if yes, performing step 202 of determining whether the main switch is released. In the step 202, if yes, performing step 122; if no, returning back to step 200. If the motor is rotated forwardly, performing the step 104 of reading and determining whether the Flash data of the current corresponding to the last torque is stored, if yes, performing step 105 of indicating the torque automatic mode, if no, performing step 114 of indicating the torque clearing mode and waiting for the next learning process. Specifically, performing step 115 of collecting the signal of the main switch and driving the motor to start up, and step 116 of detecting whether the temperature or the voltage is normal. In this step 116, if no, performing step 122; if yes, performing step 117 of collecting the maximum current and step 118 of determining whether the motor is rotated by a full speed. In this step 118, if no, compensating for the maximum current; if yes, performing step 119 of determining whether the main switch is released. In this step 119, if no, returning back to step 114; if yes, performing step 120 of stopping the machine and determining whether the pressing key of the user interface has been pressed down. In this step 120, if no, performing step 122; if yes, performing step 121 of recording the maximum current. After entering step 105, if the present mode is the constant torque mode, firstly performing step 106 of collecting the signal of the main switch and driving the motor to rotate, then performing step 107 of detecting whether the temperature or the voltage is normal. In this step 107, if no, performing step 122; if yes, performing step 108 of collecting the current, and then performing step 109 of determining whether the main switch is released. In this step 109, if yes, performing step 122; if no, performing step 110 of determining whether the preset torque value has been reached based on the stored maximum current value. In this step 110, if no, returning back to step 106; if yes, performing step 111 of stopping the machine and determining whether the pressing key of the user interface has been pressed down. In this step 111, if no, performing step 122; if yes, performing step 112 of pressing for a short time, and entering the constant torque transitory invalidation mode; or if yes, performing step 113 of pressing for a long time, and entering step 114. At this moment, the machine needs to learn again. After entering the constant torque transitory invalidation mode, firstly performing step 300 of confirming the present mode is the constant torque transitory invalidation mode via LED indicating light, and performing step 301 of collecting the signal of the main switch and driving the motor to start up, and then performing step 302 of detecting whether the temperature or the voltage is normal. In this step 302, if no, performing step 122; if yes, performing step 303 of determining whether the main switch is released. In this step 303, if no, returning back to step 301; if yes, performing step 304 of determining whether the pressing key of the user interface has been pressed down. Then, in this step 304, if no, returning back to step 304. If yes, performing step 305 of pressing for a short time, and switching to the constant torque mode; or if yes, performing step 306 of pressing for a long time, and returning back to step 114.

The electric tool disclosed by this disclosure is not limited to the structures indicated by the contents of the above embodiments and drawings. The obvious changes, replacements and modifications for the technical solutions based on this disclosure will be contained in the protection scope of the disclosure.

What is claimed is:

1. An electric tool, comprising:
   a motor;
   an implementing member driven by the motor for driving a working element; and
   a controlling circuit for controlling the electric tool, wherein the controlling circuit comprises:
   a current detecting module for detecting current flowing through the motor;
   a microprocessor for memorizing and storing a current value;
   an user interface module connected to the microprocessor for a user to select working modes, the working modes at least comprising:
   a learning mode for recording the current value when the implementing member has driven the working element; and
   a constant torque mode for driving other working elements having the same size based on the recorded current value; and
   a driving module controlled by the microprocessor for driving or stopping a torque output of the motor.

2. The electric tool according to claim 1, wherein the electric tool further comprises a power module for providing power to the microprocessor and the driving module and a current signal processing module for processing the current value detected by the current detecting module, and the microprocessor is configured to memorize and store the current value processed by the current signal processing module.

3. The electric tool according to claim 1, wherein the working modes further comprise a constant torque transitory invalidation mode for driving other working elements having different sizes from the above size.

4. The electric tool according to claim 3, wherein the electric tool comprises an user interface comprising at least one operating key for selecting the working modes, a first signal indicating light for indicating whether the learning mode is selected, a second indicating light for indicating whether the constant torque mode is selected, and a third indicating light for indicating whether the constant torque transitory invalidation mode is selected.

5. The electric tool according to claim 1, wherein the electric tool further comprises a forward and reversal rotation signal collecting module, and the working modes further comprise a reversal rotation high-efficiency mode in which the motor outputs maximum torque, and wherein the working modes enters the reversal rotation high-efficiency mode when the motor is rotated reversely no matter whether the microprocessor has memorized and stored the current value.

6. The electric tool according to claim 1, wherein the electric tool comprises a trigger for driving or stopping the motor, and the microprocessor is configured to compensate the current value detected by the current detecting module or the current value processed by the current signal processing module with a compensation coefficient inversely proportional to a pressing amount of the trigger.

7. The electric tool according to claim 1, wherein the electric tool comprises a battery pack and a circuit board having a switching element, and the controlling circuit further comprises a detecting module for detecting temperature, current and voltage of the battery pack or temperature of the switching element, and wherein the torque output of the motor is stopped when the temperature of the battery pack is higher than a preset value, or the torque output of the motor is stopped when the current value in the battery pack is higher than a preset value, or the torque output of the motor is stopped when the voltage in the battery pack is lower than a preset value, or the torque output of the motor is stopped when the temperature of the switching element is higher than a preset value.

8. A method for controlling an electric tool comprising a motor and an implementing member driven by the motor for driving a working element, the controlling method comprising the steps of:
   detecting current flowing through the motor by a current detecting module;
   memorizing and storing a current value by a microprocessor;
   selecting working modes by an user interface module, wherein the working modes comprise at least:
   a learning mode for recording the current value after the implementing member has driven the working element; and
   a constant torque mode for driving other working elements having the same size based on the recorded current value; and
   driving or stopping a torque output of the motor by a driving module controlled by the microprocessor according to the selected working mode.

9. The method according to claim 8, wherein the controlling method further comprises the steps of processing the current value detected by the current detecting module via a current signal processing module and providing power to the microprocessor and the driving module via a power module, and wherein the microprocessor can memorize and store the current value processed by the current signal processing module.

10. The method according to claim 8, wherein the working modes further comprise a constant torque transitory invalidation mode for driving other working elements having the different sizes from the above size, and wherein the controlling method further comprises the step of selecting the constant torque transitory invalidation mode by the user interface.

11. The method according to claim 8, wherein the working modes further comprise a reversal rotation high-efficiency mode in which the motor outputs the maximum torque, and the controlling method further comprises the step of collecting the forward and reversal rotation signals of the motor by a forward and reversal rotation signal collecting module, and wherein the microprocessor controls the electric tool to enter the reversal rotation high-efficiency mode when the motor is rotated reversely no matter whether the microprocessor has memorized and stored the current value.

12. The method according to claim 8, wherein the electric tool comprises a trigger for driving or stopping the torque output of the motor, and wherein the controlling method further comprises the step of compensating for the current value detected by the current detecting module or the current value processed by the current signal processing module with a compensation coefficient inversely proportional to a pressing amount of the trigger via the microprocessor.

13. The method according to claim 8, wherein the electric tool comprises a battery pack and a circuit board having a switching element, and the controlling method further comprises the step of detecting the temperature, current and voltage of the battery pack or the temperature of the switching element by a detecting module, and wherein the torque output of the motor is stopped when the temperature of the battery pack is higher than a preset value, or the torque output of the motor is stopped when the current value in the battery pack is higher than a preset value, or the torque output of the motor is stopped when the voltage in the battery pack is lower than a preset value, or the torque output of the motor is stopped when the temperature of the switching element is higher than a preset value.

\* \* \* \* \*